US010211728B2

(12) United States Patent
Hu et al.

(10) Patent No.: US 10,211,728 B2
(45) Date of Patent: Feb. 19, 2019

(54) CURRENT-SHARING CIRCUIT FOR DC-DC CONVERTERS

(71) Applicant: Hong Kong Applied Science and Technology Research Institute Company, Limited, Hong Kong (HK)

(72) Inventors: Xiaoyong Hu, Shenzhen (CN); Ziyang Gao, Hong Kong (HK); Tak Lok Shum, Hong Kong (HK)

(73) Assignee: Hong Kong Applied Science and Technology Research Institute Company, Limited, Hong Kong (HK)

( * ) Notice: Subject to any disclaimer, the term of this patent is extended or adjusted under 35 U.S.C. 154(b) by 14 days.

(21) Appl. No.: 15/447,538

(22) Filed: Mar. 2, 2017

(65) Prior Publication Data

US 2018/0254700 A1 Sep. 6, 2018

(51) Int. Cl.
*H02M 3/156* (2006.01)

(52) U.S. Cl.
CPC .................. *H02M 3/156* (2013.01)

(58) Field of Classification Search
CPC .... H02M 3/156; H02M 3/158; H02M 3/1584; H02M 3/1588; Y02B 70/1466
See application file for complete search history.

(56) References Cited

U.S. PATENT DOCUMENTS

| 4,276,590 A | 6/1981 | Hansel et al. |
| 6,201,723 B1 | 3/2001 | Farrington |
| 6,320,771 B1 | 11/2001 | Hemena et al. |
| 9,214,866 B2 | 12/2015 | Nora |
| 2010/0109713 A1* | 5/2010 | Harriman ............ H02M 3/1584 327/103 |
| 2016/0049874 A1 | 2/2016 | Kobayashi |
| 2016/0336867 A1 | 11/2016 | Nystrom |

FOREIGN PATENT DOCUMENTS

| CN | 101710701 A | 5/2010 |
| CN | 102447253 A | 5/2012 |
| CN | 103346673 A | 10/2013 |

OTHER PUBLICATIONS

ISR and Written Opinion, PCT/CN2017/076016, dated Dec. 7, 2017.
Du, Wei, et al., A New Current Sharing Method in Digitally Controlled Two-phase Buck DC/DC Converters, Power Electronics, No. 1, vol. 45, Jan. 2011, pp. 9-11 and 14.

* cited by examiner

*Primary Examiner* — Nguyen Tran
*Assistant Examiner* — Monica Mata
(74) *Attorney, Agent, or Firm* — Stuart T. Auvinen; g Patent LLC

(57) ABSTRACT

Two or more power converters are connected in parallel to supply power current to a joining node through connecting resistors. An output voltage before the connecting resistor in each power converter is sampled and divided by a sampling ratio to generate sampled voltages for each power converter. A current sharing circuit for each power converter receives the local sampled voltage and another sampled voltage from another power converter. The current sharing circuit generates an adjustment voltage that is injected into a feedback loop. The adjustment voltage modifies the output voltage of the power converter, adjusting and balancing the power current delivered by that power converter. Power currents from several power converters are reduced and balanced when the same sampling ratio is used for all power converters. Current hogging by one power converter is prevented.

15 Claims, 7 Drawing Sheets

CURRENT-SHARING CIRCUIT FOR DC-DC CONVERTERS

FIELD OF THE INVENTION

This invention relates to DC-DC power converters, and more particularly for sharing currents among parallel converters.

BACKGROUND OF THE INVENTION

Power supplies for electronic systems need to be highlight reliable and have good thermal performance while supplying high power currents. DC-DC power converters are available as modules that can be mounted to a printed-circuit board (PCB). Several power converter modules may be placed in parallel, sharing in delivery of the power supply current. However, most standard DC-DC power bricks do not provide current sharing or current balancing circuits. Some provide a TRIM voltage-adjustment input that can make adjustments to allow for current sharing in parallel DC-DC power modules.

What is desired is a DC-DC power converter with an integrated current-sharing control circuit. Two or more DC-DC power converters that having circuitry to allow sharing in providing the power-supply current are desirable. A current sharing and balancing circuit for parallel power converters is desired. A current-sharing and current-balancing parallel power converter is desired.

DETAILED DESCRIPTION

The present invention relates to an improvement in power converters. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
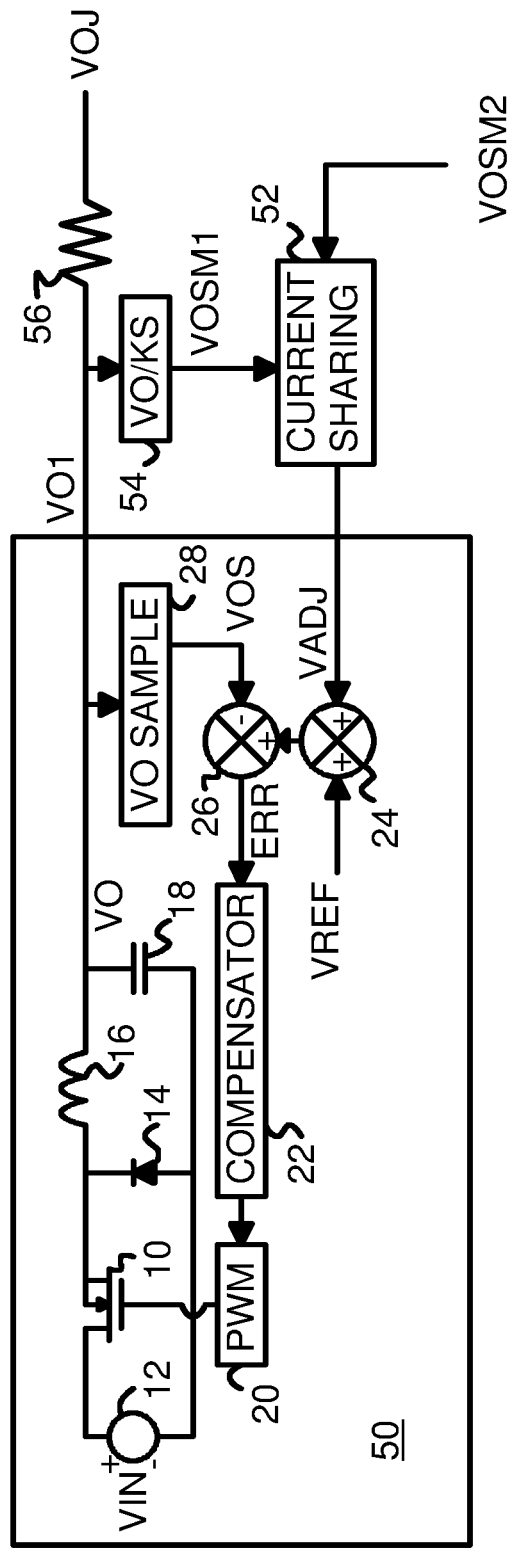
FIG. 1 is a block diagram of a Direct Current (DC) to DC converter module with integrated current sharing and current balancing.

FIG. 1 is a block diagram of a Direct Current (DC) to DC converter module with integrated current sharing and current balancing. DC-DC power converter 50 is one of several power converters that may be placed in parallel to share and balancing the power current. Input voltage supply 12 provides input voltage VIN between the drain terminal of power transistor 10 and a ground. The source of power transistor 10 supplies current that passes through inductor 16 to output voltage node VO. Capacitor 18 to ground filters VO while diode 14 to ground provides a current route for inductor 16 to release the power to load(Vo) constantly.

Output voltage sampler 28 samples output voltage VO and supplies sampled voltage VOS to an input of subtractor 26. Adder 24 combines adjust voltage VADJ with reference voltage VREF to drive the other input of subtractor 26. Subtractor 26 generate an error signal ERR that is compensated by compensator 22 to drive Pulse-Width-Modulator (PWM) 20. PWM 20 drives pulses to the gate of power transistor 10. As these pulses are modulated, the current through power transistor 10 is modulated to adjust output voltage VO. A negative feedback loop is thus provided to control output voltage VO within power converter 50.

Power current can be generated by multiple power converters 50 that are connected in parallel at joining node VOJ. Each power converter 50 has its output voltage VO connected through connecting resistor 56 to node VOJ. Since the power current is a very high current, the resistance value of connecting resistor 56 is very low. Connecting resistor 56 can be a defined resistor or can be a parasitic resistance, such as the resistance of a copper wire that carries the very high power current. Power currents from multiple power converters 50 pass through multiple connecting resistors 56 and are summed at summing node VOJ before passing through the load. Thus joining node VOJ is a current summing node.

Voltage divider 54 samples output voltage VO (VO1) and divides the sampled voltage by divisor K to generate sampled voltage VOSM1. Another power converter's voltage divider 54 generates a second sampled voltage VOSM2. Current sharing circuit 52 compares VOSM1 to VOSM2 to generate the adjust voltage VADJ that is input to adder 24. Thus a second feedback control loop uses voltage divider 54, current sharing circuit 52, adder 24, subtractor 26, compensator 22, and PWM 20 to control power transistor 10. This second feedback loop adjusts output voltage VO to allow for current sharing.

Figure 2:
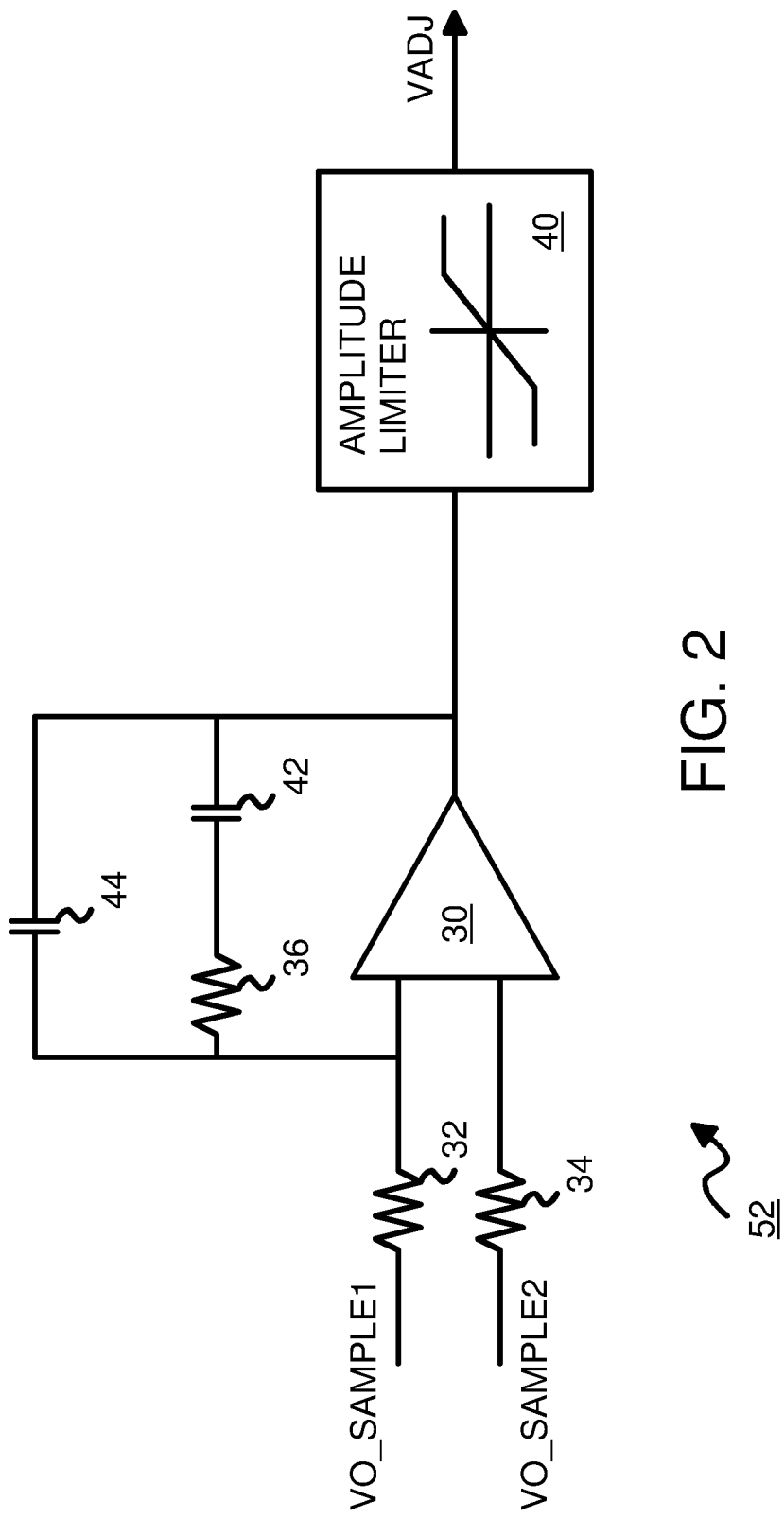
FIG. 2 shows the current sharing circuit in more detail.

FIG. 2 shows the current sharing circuit in more detail. Current sharing circuit 52 has op amp 30 that compares the two modules' sampled voltages VOSM1 and VOSM2 through input resistors 32, 34, respectively. More generically, these two inputs are VO_SAMPLE1 and VO_SAMPLE2, but they receive VOSM1 and VOSM2 for power converter 50. Current sharing circuit 52 for other power converters may receive different inputs for VO_SAMPLE1 and VO_SAMPLE2 as is shown later.

Capacitor 44 and feedback resistor 36 in series with feedback capacitor 42 provide feedback around the output and first input of op amp 30. Amplitude limiter 40 limits the maximum swings in amplitude of the output of op amp 30 to generate adjust voltage VADJ that is limited in voltage swings.

Figure 3:
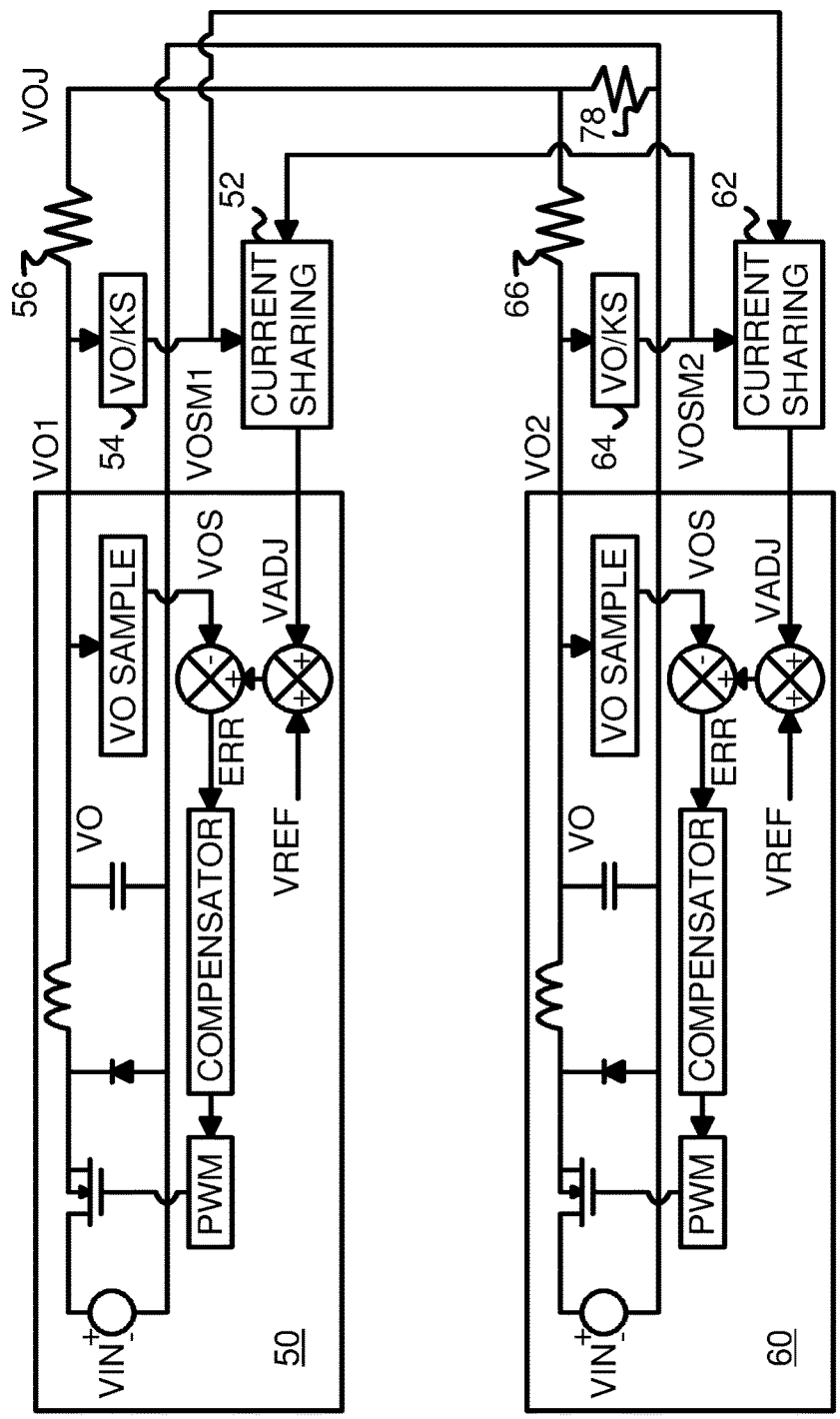
FIG. 3 shows an application of current-sharing power converters when two power converters are connected in parallel.

FIG. 3 shows an application of current-sharing power converters when two power converters are connected in parallel. First power converter 50 generates first output voltage VO1 that supplies current through connecting resistor 56 to joining node VOJ. Second power converter 60 generates second output voltage VO2 that supplies current through connecting resistor 66 to joining node VOJ. The power currents from the two power converters 50, 60 are summed at joining node VOJ to supply a combined power current that flows through load resistor 78 to ground.

First output voltage VO1 is sampled and divided by sampling ratio K by voltage divider 54 to generate first sampled voltage VOSM1. Similarly, second output voltage VO2 is sampled and divided by sampling ratio K by voltage divider 64 to generate second sampled voltage VOSM2.

Each power converter has its own sampled voltage VO(i). First sampled voltage VOSM1 is generated for power converter 50, while second sampled voltage VOSM2 is generated for second power converter 60. Current sharing circuits 52, 62 compare these two sampled voltages VOSM1, VOSM2, although the inputs to current sharing circuit 62 are reversed, so that VOSM1 is applied to VO_SAMPLE2, while VOSM2 is applied to input VO_SAMPLE1 (FIG. 2).

Each of current sharing circuits 52, 62 generate an adjust voltage for that power converter 50, 60. The adjust voltage is added to the reference voltage and used to adjust the local error signal, ultimately adjusting the pulse width modulation to the gate of power transistor 10. This feedback serves to reduce the power current supplied by each power converter 50, 60 when current sharing occurs. Local adjustments are still made through local sampled voltages VOS to keep output voltage VO constant, but the overall current level is reduced for sharing by adjust voltage VADJ.

Figure 4:
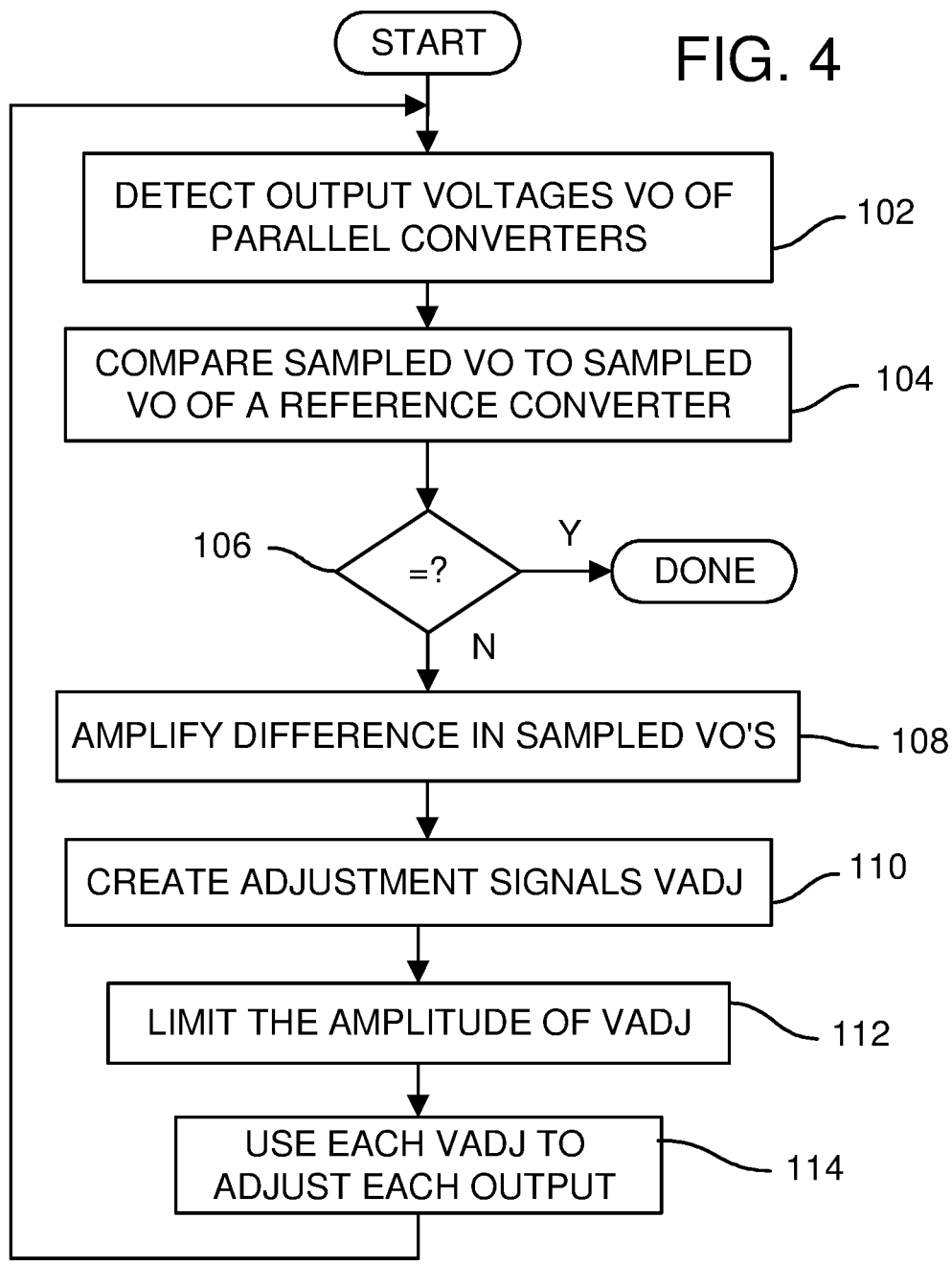
FIG. 4 is a flowchart of a method for current sharing with power converters in parallel.

FIG. 4 is a flowchart of a method for current sharing with power converters in parallel. The output voltage VO of each of the power converters is detected, step 102, such as by using voltage dividers 54, 64, . . . 74 to generates the sampled output voltages. These sampled output voltages are compared to each other or to a reference converter, such as the first power converter 50, step 104. When the sampled output voltages mismatch, step 106, then the difference in the sampled output voltages are amplified, step 108. An adjustment signal VADJ is generated for each power converter, step 110. These adjustment signals are amplitude-limited, step 112. Each adjustment signal VADJ is injected into the local power converter's feedback loop to adjust the output voltage and current for that power converter, step 114. The process can then repeat, such as periodically or continuously.

Figure 5:
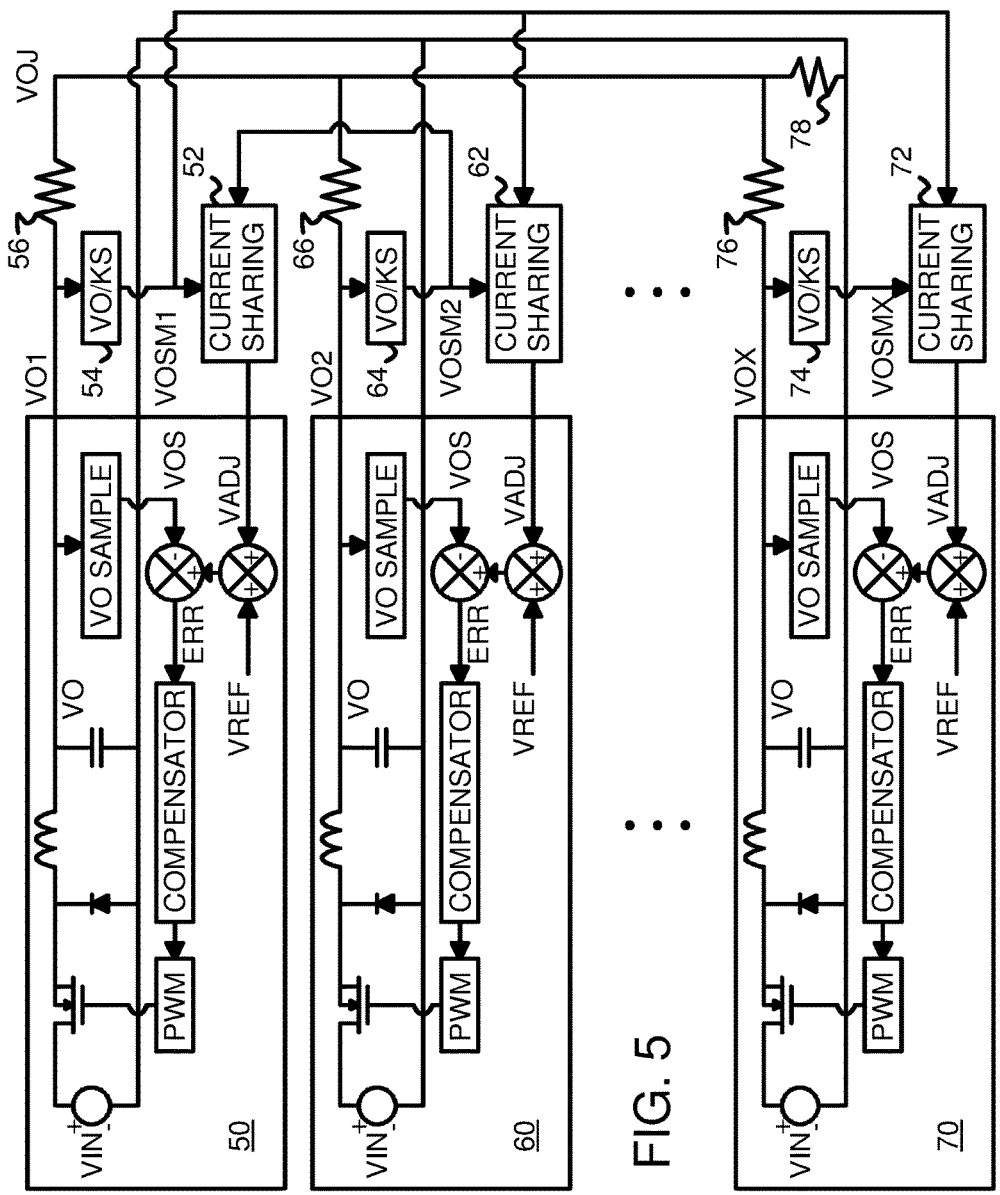
FIG. 5 shows an application of current-sharing power converters when three or more power converters are connected in parallel.

FIG. 5 shows an application of current-sharing power converters when three or more power converters are connected in parallel. First power converter 50 generates first output voltage VO1 that supplies current through connecting resistor 56 to joining node VOJ. Second power converter 60 generates second output voltage VO2 that supplies current through connecting resistor 66 to joining node VOJ. Last power converter 70 generates last output voltage VOX that supplies current through connecting resistor 76 to joining node VOJ. The power currents from the three or more power converters 50, 60, . . . 70 are summed at joining node VOJ to supply a combined power current that flows through load resistor 78 to ground.

First output voltage VO1 is sampled and divided by sampling ratio K by voltage divider 54 to generate first sampled voltage VOSM1. Similarly, second output voltage VO2 is sampled and divided by sampling ratio K by voltage divider 64 to generate second sampled voltage VOSM2. Other output voltages are also sampled and divided by sampling ratio K to generate other sampled voltages, such as last sampled voltage VOSMX.

Each power converter has its own sampled voltage VO(i). First sampled voltage VOSM1 is generated for power converter 50, while second sampled voltage VOSM2 is generated for second power converter 60, and last sampled voltage VOSMX is generated for last power converter 70.

Current sharing circuits 52, 62 compare the first two sampled voltages VOSM1, VOSM2, although the inputs to current sharing circuit 62 are reversed, so that VOSM1 is applied to VO_SAMPLE2, while VOSM2 is applied to input VO_SAMPLE1 (FIG. 2).

For the third through Nth power converter 70, the local sampled voltage VOSMX for the current power converter 70 is compared to the first sampled voltage VOSM1. Thus current sharing circuit 72 compares to VOSM1 for the third through Nth power converter 70.

Each of current sharing circuits 52, 62, . . . 72 generate an adjust voltage for that power converter 50, 60, . . . 70. The adjust voltage is added to the reference voltage and used to adjust the local error signal, ultimately adjusting the pulse width modulation to the gate of power transistor 10. This feedback serves to reduce the power current supplied by each power converter 50, 60, . . . 70 when current sharing occurs. Local adjustments are still made through local sampled voltages VOS to keep output voltage VO constant, but the overall current level is reduced for sharing by adjust voltage VADJ.

Figure 6:
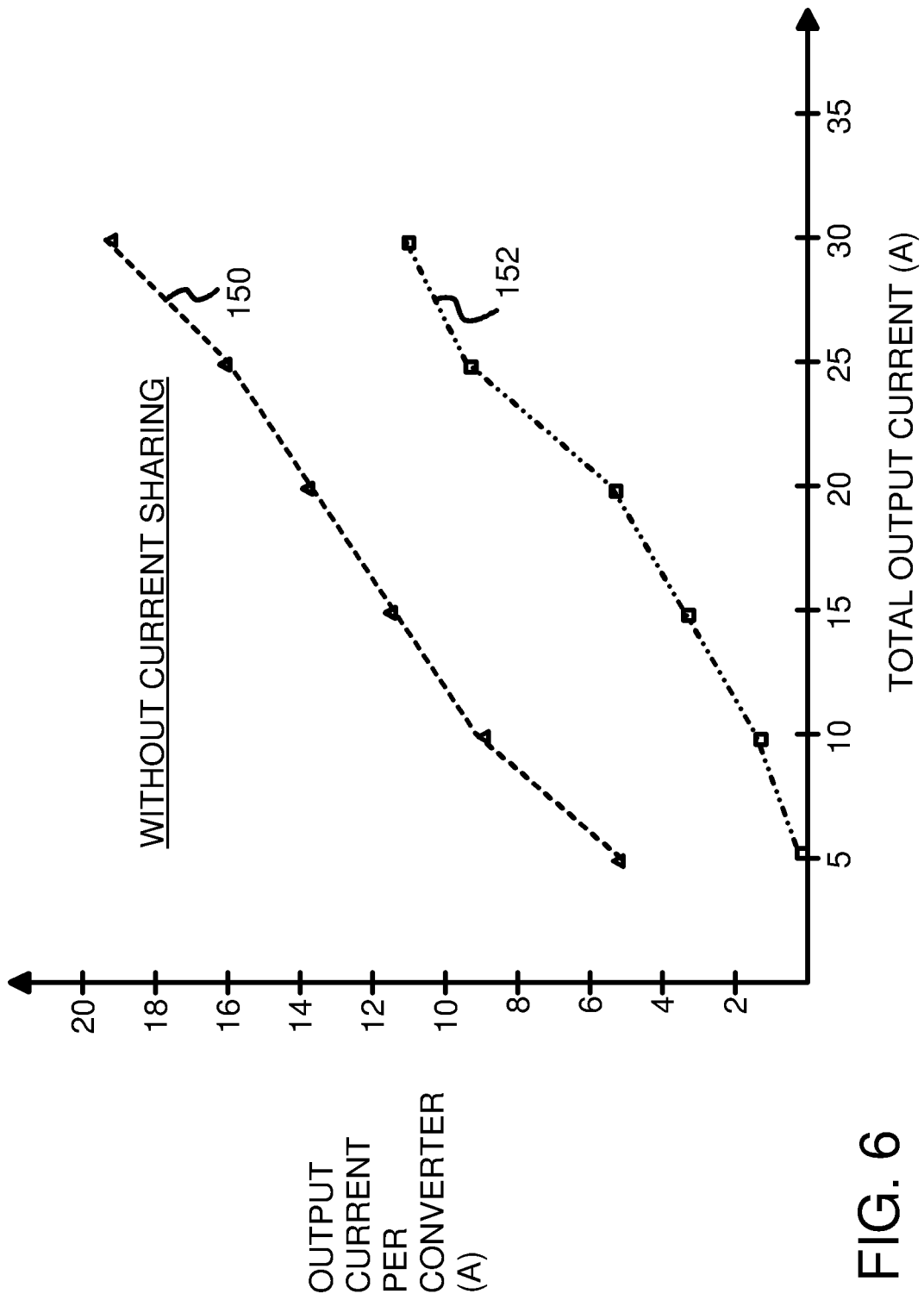
FIG. 6 is a graph showing current hogging when parallel power converters do not use current sharing.

FIG. 6 is a graph showing current hogging when parallel power converters do not use current sharing. One power converter may tend to provide most of the current, as shown in curve 150. The other power converter in parallel provides less than half of the total power current, as shown in curve 152. For example, at 10 amps total current, one power converter provides 9 amps, with the other power converter provides only 1 amp. This is undesirable.

Figure 7:
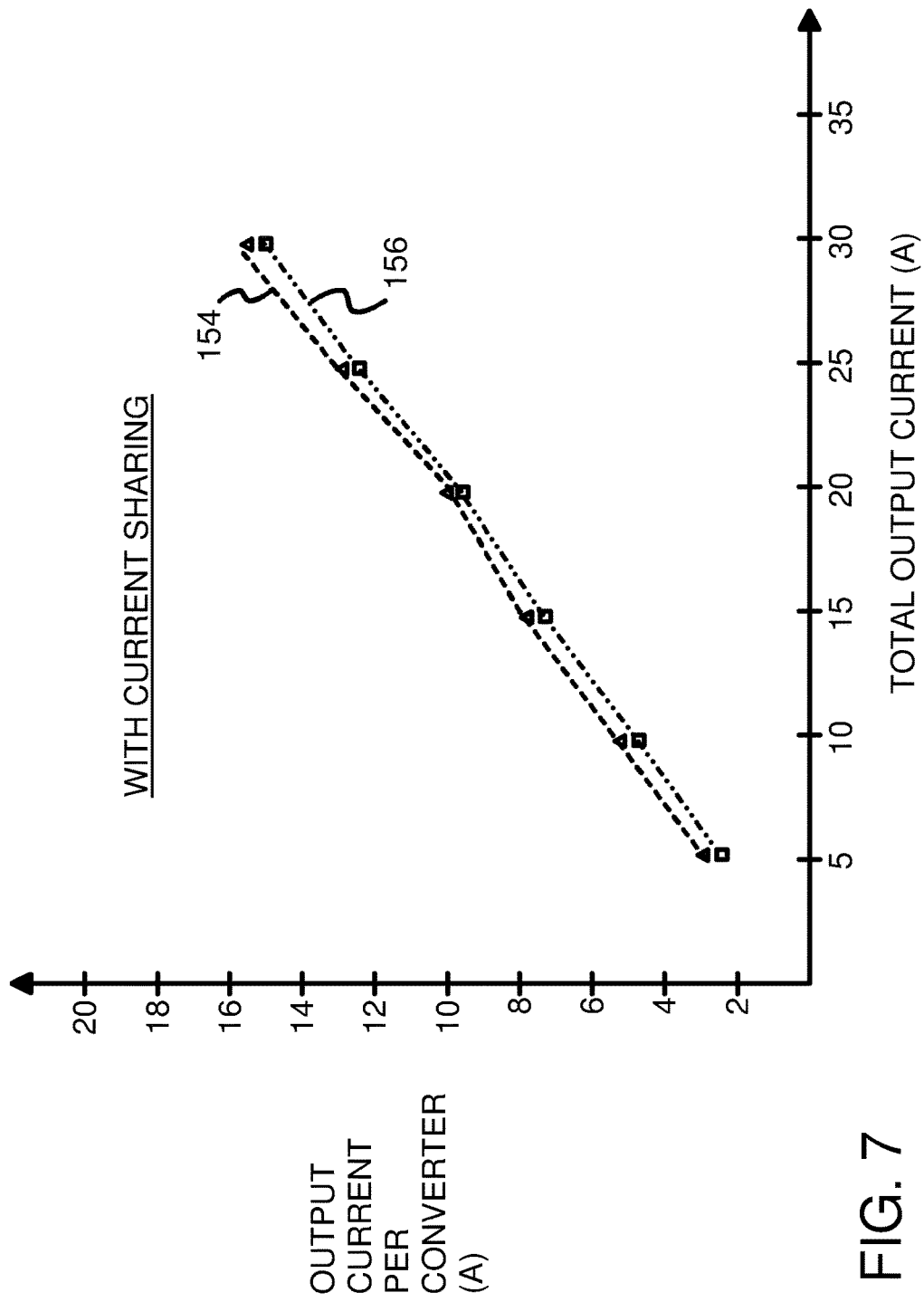
FIG. 7 is a graph showing current sharing among parallel power converters.

FIG. 7 is a graph showing current sharing among parallel power converters. Using current sharing circuits 52, 62 (FIG. 3), the power current can be split evenly when the sampling ratio K is the same for all power converters. The currents provided by the two parallel power converters are within 2-5% of each other, as curves 154, 156 show.

Alternate Embodiments

Several other embodiments are contemplated by the inventors. Output voltage is stable, while power converter 50 and current sharing circuit 52 are simple, low-cost circuits. The value K of the sampling ratio can be adjusted for the number of power converters in parallel and for other factors. The value K may depend on the requirements of the circuit and components. For example, Vo_SM (Vo divided by K) should be less than the operating voltage of the op amplifier.

Many variations are possible for power converter 50, such as different filter networks, rectifying and stabilizing devices, etc. Power converter 50 can include Buck converters, Boost converters, Buck-Boost converters, Single-Ended Primary-Inductor Converters (SEPIC), Flyback converters, Forward converters, 2-switch forward converters, active-clamp forward converters, half-bridge converters, push-pull converters, full-bridge converters, phase-shift ZVT converters, etc. Sampling nodes may be selected from various nodes within the converters or provided as ports by power converter vendors. While 2-input adders and subtractors have been shown, 3 or more inputs could be used. Various kinds of compensation may be used in the feedback loop.

While capacitor 44 and feedback resistor 36 in series with feedback capacitor 42 are shown to provide feedback around the output and first input of op amp 30, other networks of resistors, capacitors, etc. could be substituted. The response time of the compensation network of capacitors 42, 44 and resistor 36 can be designed to be longer than the voltage loop delay.

A hierarchy of current sharing circuit 52 could also be used, where pairs of power converter 50, 60 are locally compared by current sharing circuit 52 to generate an adjust voltage VADJ for that pair, while another current sharing circuit 52 compares to an external power converter 70 that is not in that pair, and generates another VADJ that is added to a third input to adder 24. Other variations are possible, such as a 3 or more input current sharing circuit 52, or more levels of hierarchy in current sharing circuits 52, 62, 72.

For example, the first controller's VOSM1 can be sent to all the other controllers for their CS reference. Alternatively, the second or third or Nth controller's VOSM_N could be sent to other controllers for their reference. Also, the Nth controller's VOSM_N could be sent to the (N+1)th controller for its reference.

Several power converters 50, 60, 70 with current sharing circuits 52, 62, 72 can be integrated together onto a printed-circuit board (PCB).

P-channel rather than n-channel power transistors 10 may be used for some technologies or processes, and inversions, buffers, capacitors, resistors, gates, or other components may be added to some nodes for various purposes and to tweak the circuit. Timings may be adjusted by adding delay components. Pulse generators could also be added, such as for PWM 20. The inverting and non-inverting inputs to the op amp may be swapped and the polarity of the output reversed. Enabling and disabling the circuit could be accomplished with additional transistors or in other ways. Pass-gate transistors or transmission gates could be added for isolation. Switches may be implemented as n-channel or p-channel transistors, or as transmission gates with parallel p-channel and n-channel transistors. Input resistors and/or capacitors could be added, or more complex input filters used.

The op amp may also other topologies, such as folded cascode, current mirror, two-stage op amps with a differential pair, folded cascode, or current mirror as the first stage, or multiple stages with a differential pair, folded cascode, or current mirror as the first stage. While one stage has been shown, two or more stages could be used, and buffering, level shifting, clocking, power-down, or other stages may be added.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A parallel power converter system comprising:
   a plurality of power converters, each power converter comprising:
   an input voltage;
   a voltage adjustment port for receiving an adjustment voltage, the adjustment voltage for adjusting a power current delivered by the power converter;
   a connecting resistor connected between a sampling node from the power converter and a joining node external to the power converter;
   a voltage divider, directly connected to the sampling node and directly connected to a divided node, that divides a voltage of the sampling node to directly generate a sampled voltage on the divided node;
   a current sharing circuit that compares the sampled voltage to an external sampled voltage from another one of the plurality of power converters to generate the adjustment voltage that is applied to the voltage adjustment port to adjust the power current;
   wherein each of the power current through each of the connecting resistor is controlled for sharing among the plurality of power converters;
   wherein joining nodes of all power converters in the plurality of power converters are connected together to drive power currents to a load;
   wherein power currents from the plurality of power converters are summed by the joining node;
   wherein the current sharing circuit further comprises:
   an op amp having a first input and a second input and an output;
   a first input resistor that couples the sampled voltage to the first input of the op amp;
   a second input resistor that couples the external sampled voltage to the second input of the op amp; and
   a feedback compensation network between the output and the first input of the op amp.

2. The parallel power converter system of claim 1 wherein each power converter further comprises:
   a power transistor connected between the input voltage and a first node;
   an inductor coupled between the first node and the sampling node;
   a Pulse-Width-Modulator for modulating a gate of the power transistor; and
   an internal feedback loop for sampling the sampling node to generate an error signal to control the Pulse-Width-Modulator.

3. The parallel power converter system of claim 2 wherein the internal feedback loop further comprises:

a voltage sampler that samples a voltage of the sampling node to generate an internally sampled voltage;

a subtractor that subtracts the internally sampled voltage from a second input to generate the error signal;

an adder that adds the adjustment voltage from the current sharing circuit to a reference voltage to drive the second input to the subtractor.

4. The parallel power converter system of claim 3 wherein the internal feedback loop further comprises:

a compensator that receives the error signal and drives the Pulse-Width-Modulator.

5. The parallel power converter system of claim 3
wherein when the plurality of power converters comprises at least three power converters, wherein a power converter in the plurality of power converters is a reference power converter that outputs the sampled voltage from the voltage divider as a reference sampled voltage;

wherein other power converters in the plurality of power converters receive the reference sampled voltage as the external sampled voltage to the current sharing circuit.

6. The parallel power converter system of claim 1 wherein the current sharing circuit further comprises:

a limiter for limiting an amplitude of the output of the op amp to generate the adjustment voltage.

7. The parallel power converter system of claim 6 wherein the feedback compensation network comprises:

a feedback capacitor coupled between the output and the first input of the op amp;

a series feedback capacitor and a series resistor coupled in series between the output and the first input of the op amp.

8. The parallel power converter system of claim 3 wherein power currents through the connecting resistors from different power converters in the plurality of power converters are matched to within 5%.

9. The parallel power converter system of claim 3 wherein power currents through the connecting resistors from different power converters in the plurality of power converters are matched to within 2%.

10. The parallel power converter system of claim 3 wherein each power converter further comprises:

a bypass capacitor coupled between the sampling node and a ground.

11. The parallel power converter system of claim 10 wherein each power converter further comprises:

a diode coupled between the first node and a ground.

12. The parallel power converter system of claim 11 wherein the power transistor is an n-channel transistor having a drain connected to the input voltage, a source connected to the first node, and a gate driven by the Pulse-Width-Modulator.

13. The parallel power converter system of claim 3 wherein the voltage divider that divides a voltage of the sampling node to generate a sampled voltage divides by a sampling ratio;

wherein the sampling ratio has a same value for all power converters in the plurality of power converters.

14. A sharing power converter comprising:

an input voltage;

a first power converter that comprises:

a first power transistor connected between the input voltage and a first node;

a first inductor coupled between the first node and a first sampling node;

a first connecting resistor connected between the first sampling node and a joining node;

a first voltage divider, connected to the first sampling node and isolated from the joining node, that divides a voltage of the first sampling node to generate a first sampled voltage on a first divided node that is isolated from the joining node;

a first current sharing circuit that compares the first sampled voltage to a second sampled voltage to generate a first adjustment voltage;

a first Pulse-Width-Modulator for modulating a first gate of the first power transistor; and a first internal feedback loop for sampling the first sampling node to generate a first error signal to control the first Pulse-Width-Modulator;

a second power converter that comprises:

a second power transistor connected between the input voltage and a second node;

a second inductor coupled between the second node and a second sampling node;

a second connecting resistor connected between the second sampling node and the joining node;

a second voltage divider, connected to the second sampling node and isolated from the joining node, that divides a voltage of the second sampling node to generate the second sampled voltage on a second divided node that is isolated from the joining node;

a second current sharing circuit that compares the second sampled voltage to the first sampled voltage to generate a second adjustment voltage;

a second Pulse-Width-Modulator for modulating a second gate of the second power transistor; and a second internal feedback loop for sampling the second sampling node to generate a second error signal to control the second Pulse-Width-Modulator.

15. The sharing power converter of claim 14 wherein the first voltage divider divides by a sampling ratio;

wherein the second voltage divider divides by the sampling ratio.

* * * * *